United States Patent [19]

Heger

[11] Patent Number: 5,259,118
[45] Date of Patent: Nov. 9, 1993

[54] ELECTRONIC CAPACITIVE LEVEL WITH DISPLAY SHOWING DIRECTION OF ROTATION TO ACHIEVE LEVEL/PLUMB

[75] Inventor: Charles E. Heger, Saratoga, Calif.

[73] Assignee: Zircon Corporation, Campbell, Calif.

[21] Appl. No.: 810,739

[22] Filed: Dec. 18, 1991

Related U.S. Application Data

[63] Continuation-in-part of Ser. No. 696,988, May 2, 1991, Pat. No. 5,083,383, which is a continuation of Ser. No. 486,643, Feb. 28, 1990, abandoned, which is a continuation-in-part of Ser. No. 326,586, Mar. 21, 1989, abandoned.

[51] Int. Cl.⁵ .................................................. G01C 9/06
[52] U.S. Cl. .......................................... 33/366; 33/365
[58] Field of Search ............... 33/366, 365, 387, 388, 33/348, 348.2; D10/65, 69; 340/727, 525, 686, 687, 689, 461

[56] References Cited

U.S. PATENT DOCUMENTS 4,551,921  11/1985  Puyo et al. .............................. 33/366
4,912,662   3/1990  Butler et al. ............................ 33/366

FOREIGN PATENT DOCUMENTS 3707345  9/1988  Fed. Rep. of Germany ........ 33/366

OTHER PUBLICATIONS

A portion of the Owner's Manual for the SmartLevel Series 200 (No Date).

Primary Examiner—William A. Cuchlinski, Jr.
Assistant Examiner—Alvin Wirthlin
Attorney, Agent, or Firm—Skjerven, Morrill, MacPherson, Franklin & Friel

[57] ABSTRACT

An electronic inclination sensor device (level) has a display which unambiguously shows the user, when the device is not level or plumb, in which direction the user should rotate the device to achieve level or plumb, by means of an LCD display showing alternatively, three icons: one icon for level/plumb, a second icon for clockwise rotation, and a third icon for counter-clockwise rotation. The icons are displayed automatically in response to the level's sensor selection logic.

6 Claims, 7 Drawing Sheets

ELECTRONIC CAPACITIVE LEVEL WITH DISPLAY SHOWING DIRECTION OF ROTATION TO ACHIEVE LEVEL/PLUMB

CROSS REFERENCE TO RELATED APPLICATIONS

This application is a continuation-in-part of U.S. patent application Ser. No. 07/696,988, filed May 2, 1991, now U.S. Pat. No. 5,083,383 which is a continuation of U.S. patent application Ser. No. 07/486,643, filed Feb. 28, 1990 (abandoned) which is a continuation-in-part of U.S. patent application Ser. No. 07/326,586, filed Mar. 21, 1989 (abandoned).

BACKGROUND OF THE INVENTION

1. Field of the Invention

The invention relates to a method and device for measurement of inclination relative to a horizontal plane. The invention in particular relates to such a device having a display which shows unambiguously how the device should be rotated to achieve level or plumb.

2. Description of the Prior Art

Various inclination measuring devices including carpenters' levels (also called torpedo levels) are well known in the art and indicate level and/or plumb by use of a bubble in a sealed tube of liquid. Also well known are electronic levels which provide an indication in addition to level and plumb such as a digital readout. These electronic levels typically provide a system of lights or other indications of the level, plumb, or non-level or non-plumb conditions.

Figures 1, 2A, 2B:
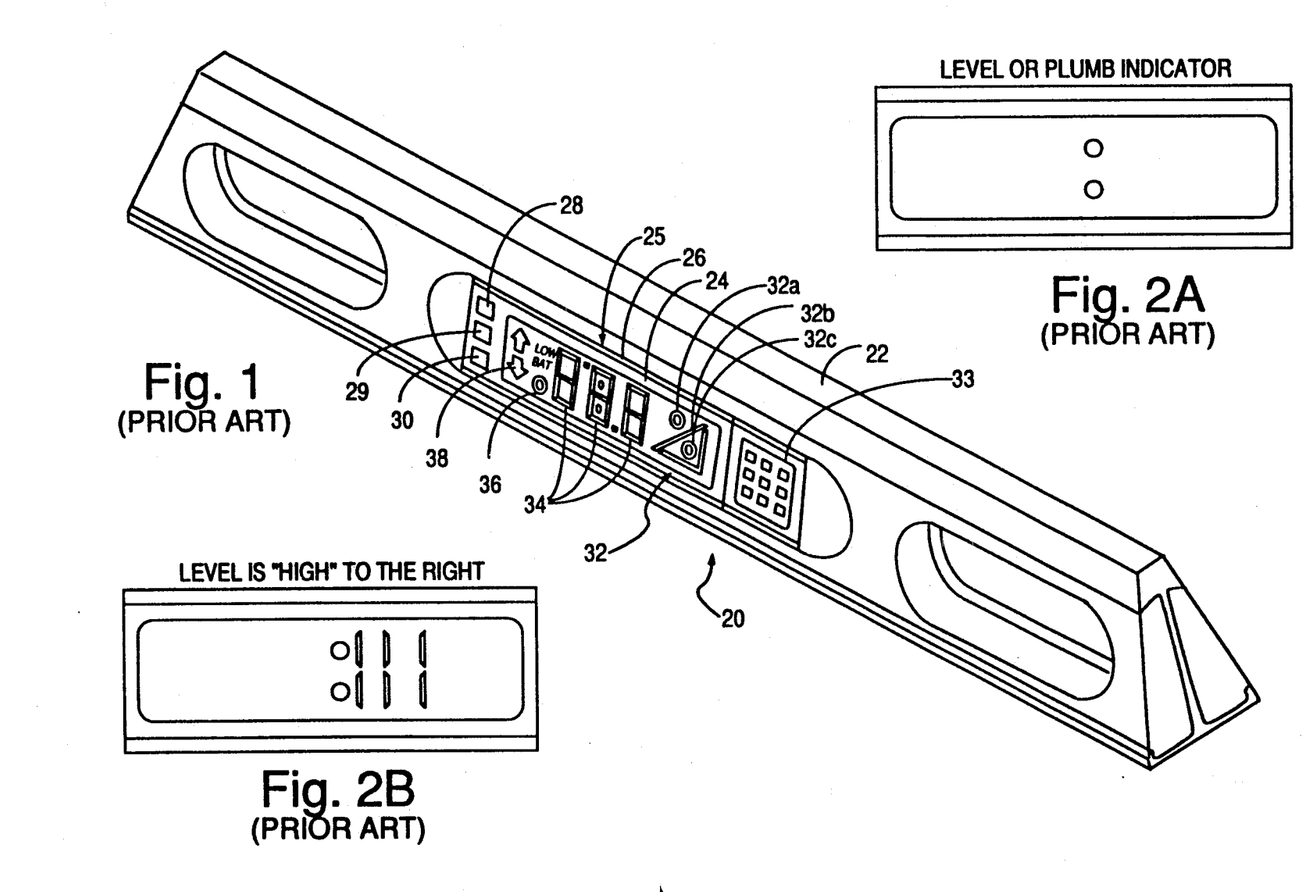
FIG. 1 shows a prior art level.
FIGS. 2A, 2B, 2C show a prior art method of displaying non-level and non-plumb positions.

U.S. Pat. No. 4,912,662 issued Mar. 27, 1990 to Butler et al discloses an inclinometer which provides various methods of showing the level or plumb or other inclination condition of the device. With reference to FIG. 1 herein, which is also FIG. 1 of the above referenced patent, an inclinometer 20 includes one of a number of different length rails such as 22, in which is removably inserted an electronic measurement unit 24 which has an outer housing 26. The face of the electronic measuring unit 24 includes a mode selector 28, a recalibration selector 29, and an accuracy range selector 30. The face of unit 24 includes a combination degree, percentage and rise/run indicator 32, three seven element alphanumeric indicators 34, a low battery indicator 36, and direction indicator 38 which indicates which direction inclinometer 20 should be moved in order to obtain a level or plumb reading. The mode selector 28 allows a selection of display modes which can selectively provide digital displays such as the angle, the rise/run, the percent slope, and also an analog display.

Figure 2C:
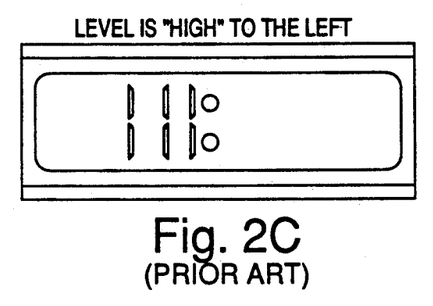

The analog display as shown in FIGS. 2A, 2B, and 2C (also from U.S. Pat. No. 4,912,662) includes a level indicator as shown in FIG. 2A which comprises two dots. In FIG. 2B, the indicator includes three vertical lines located to the right of the dot, indicating the right side of the unit 24 is high. FIG. 2C indicates that the left side is high. The degree that either side is high is indicated by the number of lines to the right or left of the two dots. Thus, three lines to the right of the two dots indicates that a level is higher to the right side than the .level would be if only one line were displayed.

In the system of Butler et al. the arrows 38 indicating in which direction the inclinometer should be moved are inherently ambiguous because they are arranged vertically, while clearly in order to achieve a level or plumb condition the device must be rotated either clockwise or counter-clockwise.

Furthermore, the analog displays shown in FIGS. 2A, 2B, and 2C while they show which side is high, this is not inherently obvious from the display but must be learned from the instructions provided or from repeated use of the device. Furthermore, the mere indication of which side of the level is high or low does not unambiguously indicate how the device should be rotated to achieve the level condition as shown in FIG. 2A.

This device while providing much useful information is rather complex to use, requiring a significant amount of understanding and/or training on the part of the user.

It would be extremely useful to have a level which has a display which unambiguously shows how the device (and the associated work piece such as a board) is to be rotated to achieve the level/plumb condition. This is especially true with such electronic levels which do not have the inherently understandable display of the basic bubble in a tube, and instead rely on some electric or electronic indication such as lights or numbers.

SUMMARY OF THE INVENTION

In accordance with the present invention, an electronic level is provided with a display which unambiguously shows in which direction the level is to be rotated in order to obtain the level or plumb conditions. It is noted that such information is not provided either by the traditional bubble in a tube level or by the arrow indications or dots and lines displays of the above-cited disclosure of Butler et al.

Moreover, it is an object of the invention to provide a display which is intuitively understood by the user, which is relatively simple to use, and also simple to implement in terms of the electronics, i.e. not requiring complex user controls or processing for indication of the level or plumb condition. Moreover, the method of displaying the direction of rotation in accordance with the invention is useful with virtually all types of electronic levels since it requires a minimal amount of information to be provided from the electronic sensors yet enhances the usefulness of all such levels.

DETAILED DESCRIPTION OF THE INVENTION

The following description of the preferred embodiment of the invention may be used with the circuitry also described below. However, it will be understood that since the invention includes essentially a method and apparatus for displaying information for the user of the level, that this method and apparatus are adaptable to many different types of electronic levels including, for instance, that disclosed by Butler et al. in U.S. Pat. No. 4,912,662. That is to say, the method of displaying and the display in accordance with the present invention are not limited to the preferred embodiment as described below but are generally applicable to all electronic levels and inclination sensing devices.

Furthermore, it is to be understood that the detailed description herein includes only the display and related circuitry and does not include much of the construction detail and operational theory disclosed in U.S. Pat. No. 5,083,383, issued Jan. 28, 1992 U.S. patent application Ser. No. 07/696,988, of which the present invention is a continuation-in-part application. This material is incorporated herein by reference.

Figure 3A:
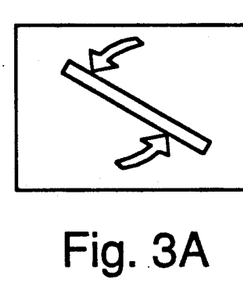
FIGS. 3A, 3B, 3C and 4A, 4B, 4C show displays for a level in accordance with the invention.
Figure 3B:
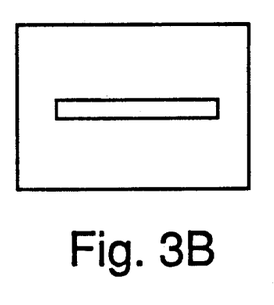
Figure 3C:
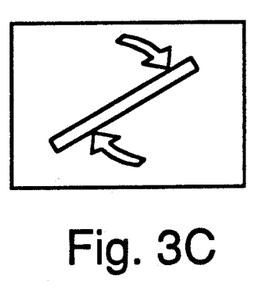

The preferred form of the level display in accordance with the invention is three icons to be displayed on an LCD (liquid crystal display) provided as part of the level, as shown in FIGS. 3A, 3B, and 3C. This is what is seen by the user of the level (typically on the LCD display) indicating the level condition or the non-level condition. The intent of these displays is to show, first of all, if the level is in the level condition then the display of FIG. 3B is shown with the single horizontal line representing for instance a plank. If the level is to be rotated in a counter-clockwise direction to obtain the level condition, the display of FIG. 3A is shown. If the level is to be rotated clockwise to achieve the level condition, the display of FIG. 3C is shown. It is to be understood that the level logic circuitry automatically determines the direction of movement to achieve the level condition with a minimal rotation of the device, i.e. the maximum rotation to be indicated would be 45°. Of course, the displays themselves do not show the exact amount of rotation needed, but merely the direction of rotation to be used. This is in order to provide a simple display and hence simplify use of the device.

Figure 4A:
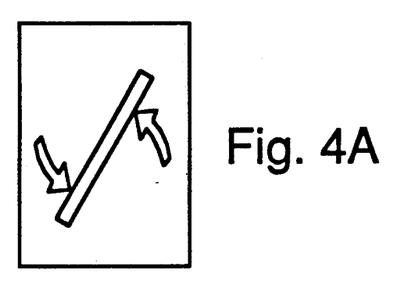
Figure 4B:
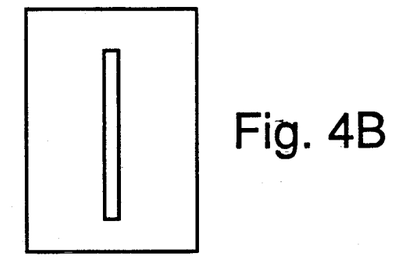
Figure 4C:
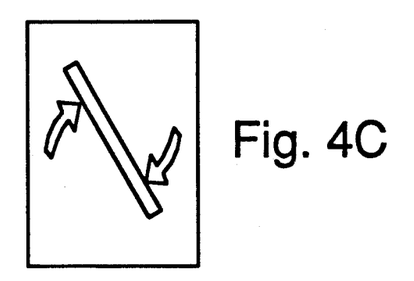

It will be understood that if the device is approximately in the vertical (plumb) position, that the display then would still be useful since the user would see the icons as shown in FIGS. 4A, 4B and 4C. These of course are the identical icons of FIGS. 3A, 3B, 3C but viewed vertically (rotated 90°).

Thus one embodiment of the invention includes display of three icons which are alternatively displayed in order to show whether the device is level or plumb, or if not, in which direction the device is to be rotated to achieve such a condition, by use of arrows showing the needed direction of rotation.

As will be understood by one of ordinary skill in the art, such a display is compatible with most types of electronic levels which typically not only determine whether the device is actually level or plumb, but also determine the amount of inclination. From this, it is possible to determine whether the device must be rotated one way or the other to achieve level or plumb. An improvement herein is that in prior art levels while such information was perhaps internally available in electronic form, the level display did not provide the indication unambiguously to the user.

Figure 5:
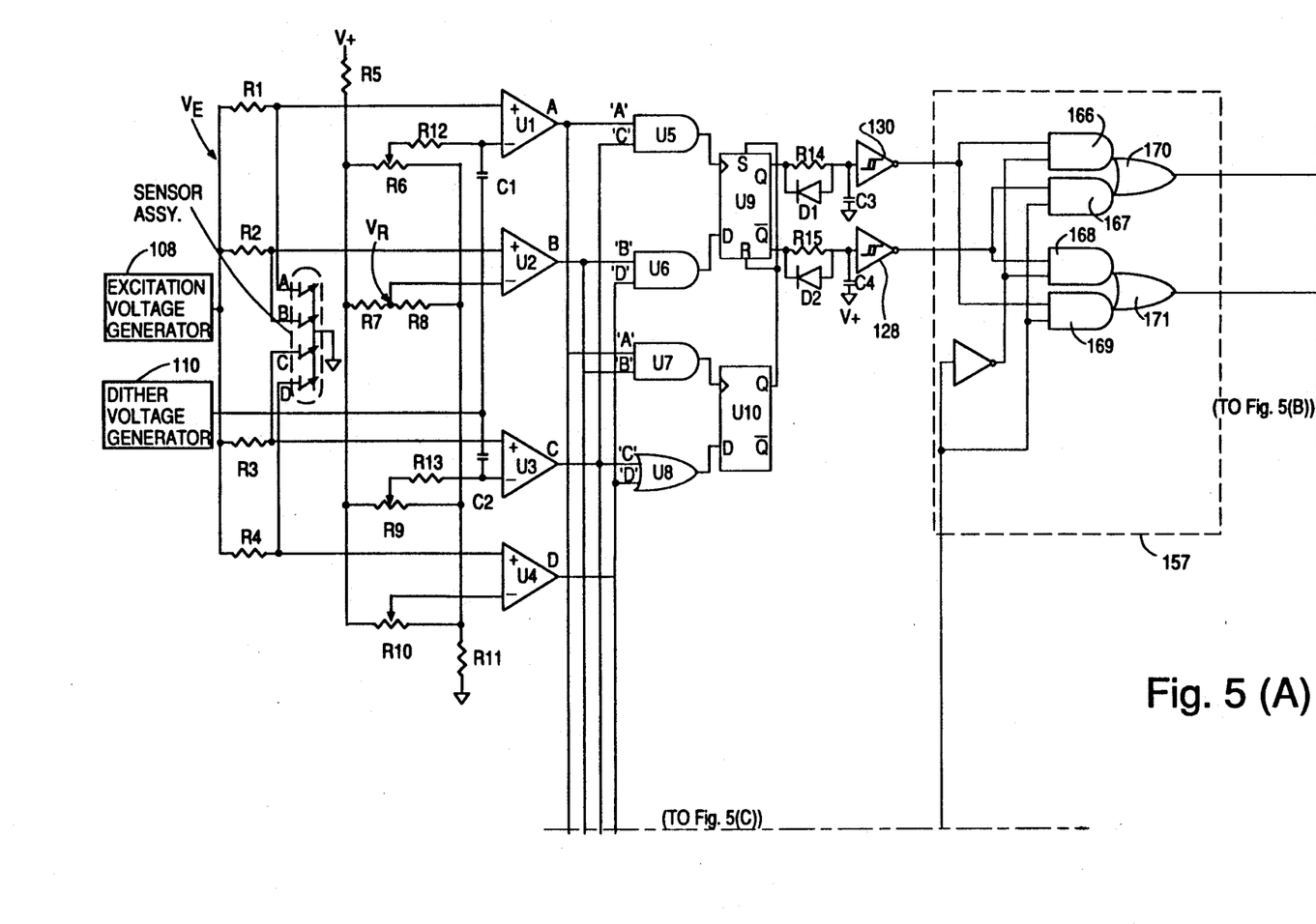
FIGS. 5(a), 5(b), 5(c) show a schematic of one embodiment of logic circuitry for a level in accordance with the invention.

FIGS. 5(a), 5(b), 5(c) together show the logic circuitry for one embodiment of the invention. The excitation voltage $V_E$ from excitation voltage generator 108 charges sensor assembly capacitors A and B through respectively resistors R1 and R2 when the voltage $V_E$ is high. If sensor capacitors A, B are matched (equal value) and resistors R1, R2 are matched, then their voltages $V_1$ and $V_2$ will have identical voltage vs. time characteristics and both will reach the common reference voltage, $V_R$, of comparators U1 and U2, at the same time. The outputs of comparators U1 and U2 will then change state at the same time. If, however, sensor capacitors A, B are not the same value then the sensor electrode with the lower capacitance will charge quicker and reach the reference voltage before the other electrode circuit. The outputs of comparators U1, U2 will not change at the same time and this time difference is used to indicate an out-of-level or unbalanced condition. A longer low output or "zero" time for the excitation voltage $V_E$ ensures that sensors capacitors A, B are fully discharged before starting a new cycle.

The comparator outputs for a given pair of diagonal electrodes selected from electrodes A, B, C, D (for example, electrodes A and C) are connected to the inputs of an AND gate (for example, U5), with the other diagonal electrode pair B and D similarly connected.

Assume that electrodes B and C are the active electrodes, in which case electrode A will reach the reference voltage $V_R$ before electrode C, and when C (the active element of the diagonal pair) does reach threshold, the output of U5 will go high. Similarly, electrode D will reach threshold before B. The two active electrodes, B and C, are then controlling when the outputs of the AND gates, U5 and U6, go high. The non-active electrodes, A and D, reach the reference voltage $V_R$ at a time prior to that of the active electrodes B and C and their associated comparator outputs are then at a one level, waiting for B and c to "catch up" at times when the AND gate outputs of U5 and U6 go high. The other positions of the sensor assembly operate in a similar manner.

The two electrode pair auto-select logic outputs of gates U5 and U6 are processed to yield meaningful information for the user. These two signals are used as the Data and Clock inputs of a D-type flip-flop U9. If the Clock signal from U5 precedes the Data from U6 in time, the Data (or D) input of flip-flop U9 will be zero when the clock edge occurs, leaving flip-flop U9 in a logical zero state ($Q=0$, $\overline{Q}=1$), regardless of what state it was in prior to the clock. If the opposite condition exists, flip-flop U9 assumes the opposite state after the clock ($Q=1$, $\overline{Q}=0$). The outputs of flip-flop U9 indicate the sensor assembly's direction from level. No indication of a level condition exists yet, however.

To provide an indication of level, a ten arc minute "window" (for instance) is developed. This is done by "dithering", or wiggling (by dither voltage generator 110), the Clock signal to flip-flop U9 in time with respect to the Data signal. If the Data signal to flip-flop U9 is within the dithering window of the Clock, flip-flop U9 will continue to change state between "1" and "0" as the Clock signal is sometimes early and sometimes late with respect to the Data signal. By adjusting the amount of time dither, a ten arc minute window can be established.

Dithering of the Clock signal is achieved by slightly modifying the threshold voltage into comparators U1 and U3 with a low level sawtooth waveform. The dithering signal is AC coupled via capacitors C1 and C2 so that any average direct current on the dither signal will not affect the average reference voltage.

To indicate a level condition (that is, the Data signal edge is within the dithered window) the outputs (both Q and $\overline{Q}$) of flip-flop U9 are filtered by constantly discharging the capacitors C2 and C3 through diodes D1 and D2. If flip-flop U9, remains constant in either a 0 or a 1 state (indicating an out-of-level condition), the appropriate capacitor (either C3 or C4) will charge through either resistor R14 or R15.

The outputs of flip-flops U9 and U10 are low pass filtered by the two filters including respectively R14 and C3 and R15 and C4. The output of each of these low pass filters is then provided to respectively (via Schmitt triggers 128, 130) a CW/CCW (clockwise/-counter-clockwise) sense selector 157.

The CW/CCW sense selector 157 is required to interchange the outputs of the signal processor (outputs of Schmitt triggers 130,128) to maintain correct CW and CCW rotational sense as the sensor assembly is rotated from a level position to a plumb position.

Level/plumb detector logic 180 including gates 159, 160, 161, 162, 165 and flip-flops 163, 164 detects the level and plumb conditions. The output of gate 165 is used to drive AND-OR select logic comprised of gates 166, 167, 168, 169, 170, 171 which implement the CW/CCW sense selector 157. This logic in essence is a double pole double throw (DPDT) logic switch which, when gate 165 output is a logic one (level condition), the output of Schmitt trigger 128 goes to gate 140 input and likewise gate 130 output goes to gate 142 input.

These logic paths are reversed when the device is in the plumb condition.

The output signals from CW/CCW sense selector logic 157 drive LCD display encoder 136 which includes as shown AND gates 138, 140, 142 and inverter 144. The outputs of AND gates 138, 140, 142 each drive one portion of LCD display driver 146 (shown here as three exclusive-OR gates 148, 150, 152.) The three outputs of LCD display driver 146 then each cause LCD display 156 to show a particular icon, in combination with conventional LCD voltage generator 158. The three icons are identified here as CC (clockwise), Level, and CCW (counter-clockwise); these are the three icons shown in FIGS. 3A, 3B, and 3C. It will be understood that the LCD display driver 146 is conventionally connected (hard wired) so as to generate the three different icons in response to the input signals and selects the proper icon to be displayed in accordance with the signals provided by the two low pass filters, and then drives the LCD display 156 to show the desired display. Such operation is conventional and well known in the art.

Figure 6:
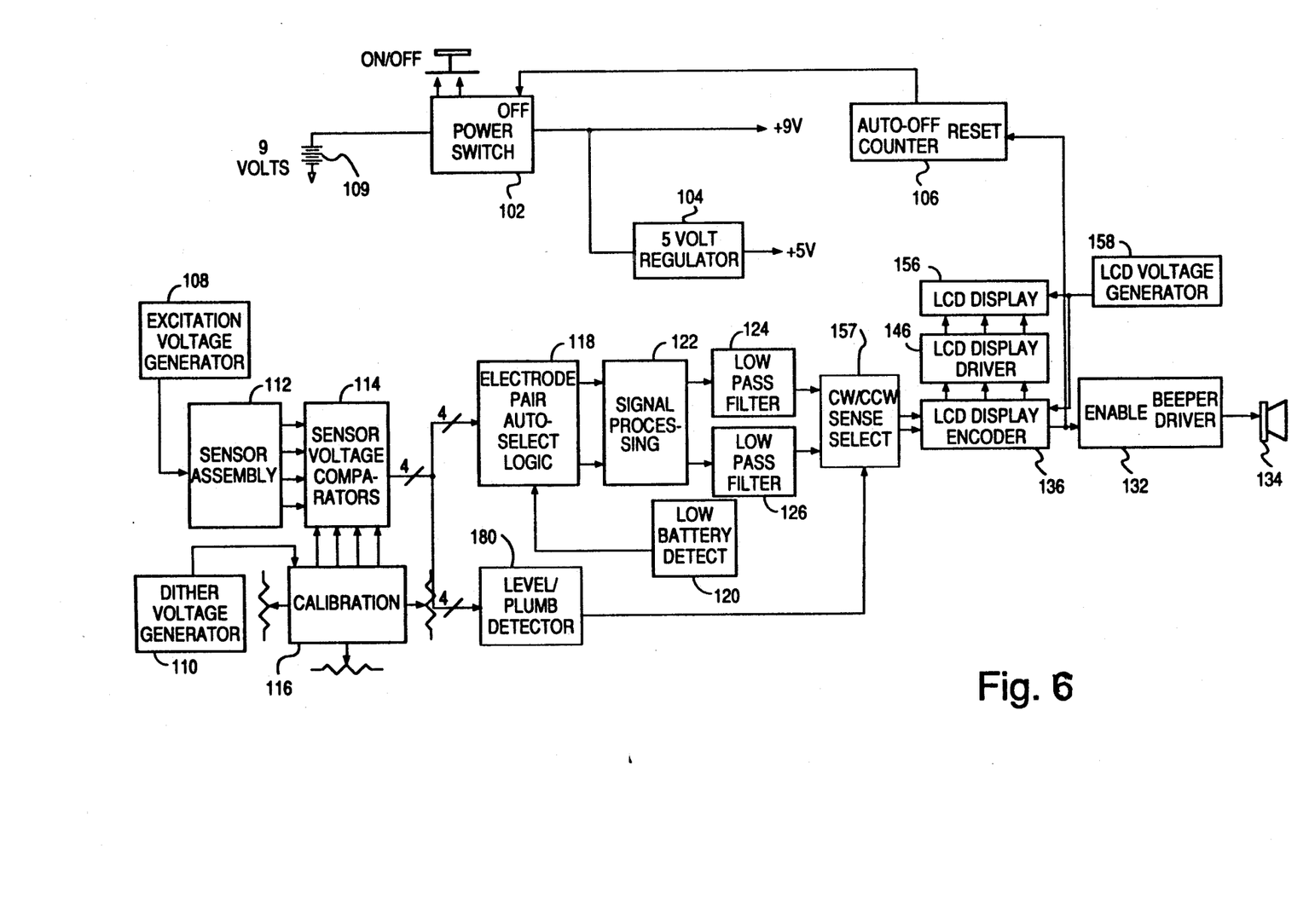
FIG. 6 shows a block diagram of the level of FIGS. 5(a), 5(b), 5(c).

FIG. 6 shows the entire level, device in block diagram form. Shown are battery 109, power switch 102, five volt regulator 104, auto-off counter 106, excitation voltage generator 108, dither voltage generator 110, sensor assembly 112, sensor voltage comparator 114, calibration circuit 116, electrode pair auto select logic 118, low battery detector 120, signal processing circuitry 122, low-pass filters 124, 126, LCD display encoder 136, LCD display driver 146, LCD 156, beeper driver 132 for driving beeper 134, CW/CCW sense selector 157, LCD voltage generator 158, and level/-plumb detector 180. Note that the auto-off counter 106 automatically turns the device off if the sensors 112 are electrically quiescent for a predetermined period such as two minutes.

Power switch 102 has several advantageous features including a single, non-mechanical latching switch controlling both on and off functions; no standby power drain when off; and input for remote off signal.

It will be understood that the embodiments of the invention described herein are illustrative and especially that the description of the logic and electronics is not limiting, because the use of the icons as shown for instance in FIGS. 3A, 3B, 3C to unambiguously indicate the direction of rotation to be used would be compatible with many other different electronic or electrical levels or other inclination display devices. For instance, instead of using an LCD display, one could merely illuminate one of three light sources each located behind a translucent plate having formed on it one of the three icons.

The above description of the invention is illustrative and not limiting; further embodiments will be apparent in light of the teachings of the present disclosure and appended claims.

I claim:

1. A method of providing an indication of inclination for a level device comprising the steps of:
   determining if the device is level of plumb;
   if the device is level or plumb, illuminating a first icon which is a line oriented respectively horizontal or vertical relative to the earth's gravitational plane; and
   if the device is not level of plumb, illuminating either the second or third icon indicating the direction of rotation needed to achieve level or plumb with a minimum amount of rotation, the second and third icons respectively being a line juxtaposed to at least one arrow indicating a direction of rotation, and a line juxtaposed to at least one arrow indicating a direction of rotation opposite to that of the arrow associated with the second icon.

2. The method of claim 1, wherein the second and third icons each is an inclined line relative to a length of the display and having two arrows, one arrow juxtaposed to each end of the inclined line indicating the direction of rotation.

3. The method of claim 1, wherein the step of determining includes the steps of:
   detecting if the inclination device is closer to being level of being plumb; and
   selecting the direction of rotation in response to the detected inclination.

4. An inclination sensing device comprising:
   a sensor for sensing the inclination of the device;
   a display for illuminating three icons denoting respectively level or plumb clockwise rotation to achieve level or plumb, and counter-clockwise rotation to achieve level or plumb, the first icon being a line and the second and third icons respectively being a line juxtaposed to at least one arrow indicating a direction of rotation, and a line juxtaposed to at least one arrow indicating a direction of rotation opposite to that of the arrow associated with the second icon; and
   means for displaying one of the three icons indicating the attitude of the device in response to the sensed inclination, by illuminating one of the icons.

5. The device of claim 4, where the first icon is a straight line, and each of the second and third icons are a line inclined with respect to a frame of the display and having two arrows, one arrow juxtaposed to each end of the line thereby indicating the direction of rotation to achieve level or plumb with a minimum amount of rotation.

6. The device of claim 4, wherein the means for displaying includes:
   a level/plumb detector for detecting if the device is approximately level or approximately plumb;
   a sense selector for selecting a correct sense of rotation in response to the detection of approximately level or plumb; and
   a display encoder for selecting one of the three icons depending on the selected correct sense of rotation.

* * * * *